US010803136B2

United States Patent
Frerking

(10) Patent No.: US 10,803,136 B2
(45) Date of Patent: Oct. 13, 2020

(54) APPARATUS AND METHOD ENABLEMENT OF CUSTOMER INFORMATION CONTROL SYSTEMS ON A MAINFRAME COMPUTER

(71) Applicant: Walmart Apollo, LLC, Bentonville, AR (US)

(72) Inventor: John R. Frerking, Prairie Grove, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 536 days.

(21) Appl. No.: 14/774,514

(22) PCT Filed: Mar. 11, 2014

(86) PCT No.: PCT/US2014/023491
§ 371 (c)(1),
(2) Date: Sep. 10, 2015

(87) PCT Pub. No.: WO2014/150523
PCT Pub. Date: Sep. 25, 2014

(65) Prior Publication Data
US 2016/0034593 A1    Feb. 4, 2016

Related U.S. Application Data

(60) Provisional application No. 61/799,136, filed on Mar. 15, 2013.

(51) Int. Cl.
*G06F 16/954*    (2019.01)
*G06F 16/10*    (2019.01)
*H04L 29/08*    (2006.01)

(52) U.S. Cl.
CPC ............ *G06F 16/954* (2019.01); *G06F 16/10* (2019.01); *H04L 67/06* (2013.01)

(58) Field of Classification Search
CPC .................... G06F 17/30873; G06F 16/954
See application file for complete search history.

(56) References Cited

U.S. PATENT DOCUMENTS 6,571,282 B1    5/2003    Bowman-Amuah
7,028,158 B1 *  4/2006    Beatty .................. G06F 3/0608
                                                711/165

(Continued)

OTHER PUBLICATIONS

Rayns et al., "CICS Transaction Server from Start to Finish", 2011.*

(Continued)

*Primary Examiner* — Dawaune A Conyers
(74) *Attorney, Agent, or Firm* — McCarter & English, LLP; David R. Burns

(57) ABSTRACT

Digital information is transferred between an application that processes a plurality of on-line transactions executed on the mainframe computer and a file system of an operating system. A programmable processor identifies the data held in memory under control of the application. The programmable processor calls a first routine to associate a portion of the data with a container of the application and calls a second routine to dynamically allocate a file of the file system. The programmable processor opens the file of the file system and calls an input/output routine of the operating system to transfer the data associated with the container to the file of the file system.

13 Claims, 5 Drawing Sheets

(56) References Cited

U.S. PATENT DOCUMENTS

| | | | | |
|---|---|---|---|---|
| 7,873,619 | B1* | 1/2011 | Faibish | G06F 17/30091 |
| | | | | 707/705 |
| 8,291,170 | B1* | 10/2012 | Zhang | G06F 11/1466 |
| | | | | 711/135 |
| 2005/0273787 | A1* | 12/2005 | Kovachka-Dimitrova | |
| | | | | H04L 67/34 |
| | | | | 719/310 |
| 2006/0235764 | A1 | 10/2006 | Bamborough et al. | |
| 2006/0294521 | A1* | 12/2006 | Wietlisbach | G06F 9/45512 |
| | | | | 718/101 |
| 2007/0060367 | A1* | 3/2007 | Heler | G06Q 10/06 |
| | | | | 463/42 |
| 2010/0064299 | A1* | 3/2010 | Kacin | G06F 9/45537 |
| | | | | 719/317 |
| 2010/0100556 | A1 | 4/2010 | Correll, Jr. | |
| 2010/0228708 | A1* | 9/2010 | Lehr | G06F 17/30067 |
| | | | | 707/705 |
| 2012/0124121 | A1 | 5/2012 | Pope et al. | |
| 2012/0284721 | A1* | 11/2012 | Antani | G06F 9/466 |
| | | | | 718/101 |

OTHER PUBLICATIONS

IBM, "CICS Application Programming Guide", 2004.*
IBM, "CICS Application Programming Guide", 2004 (Year: 2004).*
Rayns et al., "CICS Transaction Server from Start to Finish", 2011 (Year: 2011).*
International Preliminary Report on Patentability issued in International Application No. PCT/US2014/023491, dated Sep. 24, 2015.
International Search Report and Written Opinion issued in International Application No. PCT/US2014/023491, dated Aug. 19, 2014.

* cited by examiner

APPARATUS AND METHOD ENABLEMENT OF CUSTOMER INFORMATION CONTROL SYSTEMS ON A MAINFRAME COMPUTER

CROSS REFERENCE TO RELATED APPLICATIONS

This application is a 35 U.S.C. § 371 National Stage filing of International Application No. PCT/US2014/023491, entitled "APPARATUS AND METHOD ENABLEMENT OF CUSTOMER INFORMATION CONTROL SYSTEMS ON A MAINFRAME COMPUTER," filed on Mar. 11, 2014, which claims priority to U.S. Provisional Patent Application Ser. No. 61/799,136, entitled "APPARATUS AND METHOD ENABLEMENT OF CUSTOMER INFORMATION CONTROL SYSTEMS ON A MAINFRAME," filed on Mar. 15, 2013, the content of each of which is hereby incorporated by reference in its entirety.

FIELD OF INVENTION

Embodiments relate generally to transferring digital information between an application processing on-line transactions and a file system of an operating system.

BACKGROUND

An application that processes a plurality of on-line transactions conventionally runs on a server due to processing power and memory size needed to process the large number of on-line transactions. The application that processes the plurality of on-line transactions gathers the on-line web services requests from multiple platforms and for some operations makes requests to a file system of an operating system. Users interact with the application via a user interface.

Applications that process the plurality of on-line transactions are often referred to as a middleware application. One known application that processes a large number of on-line transactions is a Customer Information Control System (CICS) application. A transaction is a unit of processing initiated by a request. A CICS application is a middleware application that processes a high volume of on-line transactions. A host for the on-line transaction application is often referred to as a transaction server. A transaction server can be a multi-tasking, multi-user computer system.

In conventional approaches, users make interactive on-line web services requests via the on-line transaction application. The on-line transaction application processes a plurality of on-line transactions and manages the file requests sent to the file system running on the server. Due to the nature of the volume of on-line transactions, for example, the server returns large payloads or volumes of data in response to file requests. The attempt to return large amounts of data creates a delay in the server's response time. On-line transactions can be functionally completed, however, time delays severely limits the system's maximum transfer rate of data between an on-line transaction processing application and a file system of a server, imposing limitations on the practical implementation of an on-line transaction processing system.

SUMMARY

Taught herein are systems and methods that utilize multi-threaded on-line transactions to manage data storage and retrieval from a file system of an operating system of a server. Some embodiments are directed to transferring digital information, for example data, between an application that processes a plurality of on-line transactions on a server and a file system of the server. Some embodiments are directed to processing on-line transactions in a batch manner between a file system of the operating system. Some embodiments utilize multi-threaded on-line transactions to manage data in the file system of the server operating system to enable a plurality of on-line transactions to be executed simultaneously between the memory under control of the on-line transaction processing application and the file system of the server operating system, to create a real-time run and response environment. A multi-threaded transaction can include the ability to process parallel process concurrent algorithms within a single on-line transaction, thereby enhancing the ability to handle asynchronous events.

Embodiments taught herein are directed to a computer implemented method for transferring digital information between an application that processes a plurality of on-line transactions executed on a server and a file system of a server. The method includes execution of executable code identifying data held in memory under control of the application. Execution of executable code to perform the method calls a first routine to associate a portion of the data with a container of the application. A container is a block of data having a unique identifier that can be passed between programs or transactions. The container can have a variable size determined by the available storage or memory, and refers to a data structure existing within an application parameter. A routine can include transactions to structure the data within the application. Execution of executable code to perform the method calls a second routine to dynamically allocate a file of the file system of the server. Execution of the executable code to perform the method then opens the file of the file system and call an input/output routine of the server operating system to transfer the data associated with the container to the file of the file system.

In some embodiments, the method includes executing the executable code to call a third routine to dynamically de-allocate the file of the file system. In some embodiments, the method may include executing the executable code to identify data of the file system held in memory and closing the file.

In some embodiments, the method may include receiving a transfer request from the application that processes a plurality of on-line transactions for the file. In some embodiments, the method may include configuring the file for a bi-directional transfer between the application that processes a plurality of on-line transactions and the file system of the operating system.

In some embodiments, the method may include executing executable code to dynamically allocate the file to batch process a plurality of data associated with the container. In some embodiments, the method may perform in a Customer Information Control System that processes a plurality of on-line transactions.

Embodiments taught herein are directed to a system for transferring digital information between an application that processes a plurality of on-line transactions executed on a server and a file system of a server operating system. The system comprises a memory under control of the application to store data and executable code.

The executable code is held in memory and a processor is operatively coupled to the memory for example, a processor with a central processing unit, executes the code to identify the data. Execution of the executable code by the processor calls a first routine to associate a portion of the data with a container of the application. Execution of the executable code by the processor calls a second routine to dynamically allocate a file of the file system of the operating system. Execution of the executable code by the processor causes the file system to open the file and calls an input/output routine of the operating system to transfer the data associated with the container to the file of the file system.

In some embodiments, execution of the executable code by a processor of the system can call a third routine to dynamically de-allocate the file of the file system. In some embodiments, execution of the executable code by a processor of the system can identify the data of the file system of the operating system held in the memory and close the file. In some embodiments, execution of the executable code by a processor of the system can receive a transfer request from the application that processes a plurality of on-line transactions for the file.

In some embodiments, execution of the executable code by a processor of the system can update the file, for a bi-directional transfer between the application that processes a plurality of on-line transactions and the file system of the operating system. In some embodiments, execution of the executable code by a processor of the system can enable the file to batch process a plurality of data associated with the container.

In another embodiment, a non-transitory computer-readable medium has stored thereon computer-executable instructions that when executed by at least one processor cause a computer processor with a central processing unit to execute a method transferring digital information between an application that processes a plurality of on-line transactions executed on a server and a file system of an operating system. A processor executing the computer executable instructions identifies data held in memory under control of the application. A processor executing the computer executable instructions calls a first routine to associate a portion of the data with a container of the application. The processor executing the computer-executable instructions calls a second routine to dynamically allocate a file of the file system of the operating system. The processor executing the computer executable instructions then opens the file of the file system of the operating system and calls an input/output routine of the operating system to transfer the data associated with the container to the file of the file system of the operating system.

In some embodiments, the non-transitory computer readable medium may include computer executable instructions for calling a third routine to dynamically de-allocate the file of the file system of the operating system. In some embodiments, the non-transitory computer readable medium may include computer executable instructions for identifying data of the file system of the operating system held in memory and closing the file.

In some embodiments, the non-transitory computer readable medium may include computer executable instructions for receiving a transfer request from the application that processes a plurality of on-line transactions for the file. In some embodiments, the non-transitory computer readable medium may include computer executable instructions for configuring the file for a bi-directional transfer between the application that processes a plurality of on-line transactions and the file system of the operating system.

In some embodiments, the non-transitory computer readable medium may include instructions for enabling the file to batch process a plurality of data associated with the container. In some embodiments, the non-transitory computer readable medium may include instructions for a Customer Information Control System suite of applications that processes on-line transactions.

Any combination of the embodiments is envisioned. Other objects and features will become apparent from the following detailed description considered in conjunction with the accompanying drawings. It is to be understood, however, that the drawings are designed as an illustration and not as a definition of the limits of the invention.

BRIEF DESCRIPTION OF THE DRAWINGS

The accompanying drawings are not intended to be drawn to scale. In the drawings, each identical or nearly identical component that is illustrated in various figures is represented by a like numeral. For the purposes of clarity, not every component may be labeled in every drawing. In the drawings.

DETAILED DESCRIPTION

Figure 1:
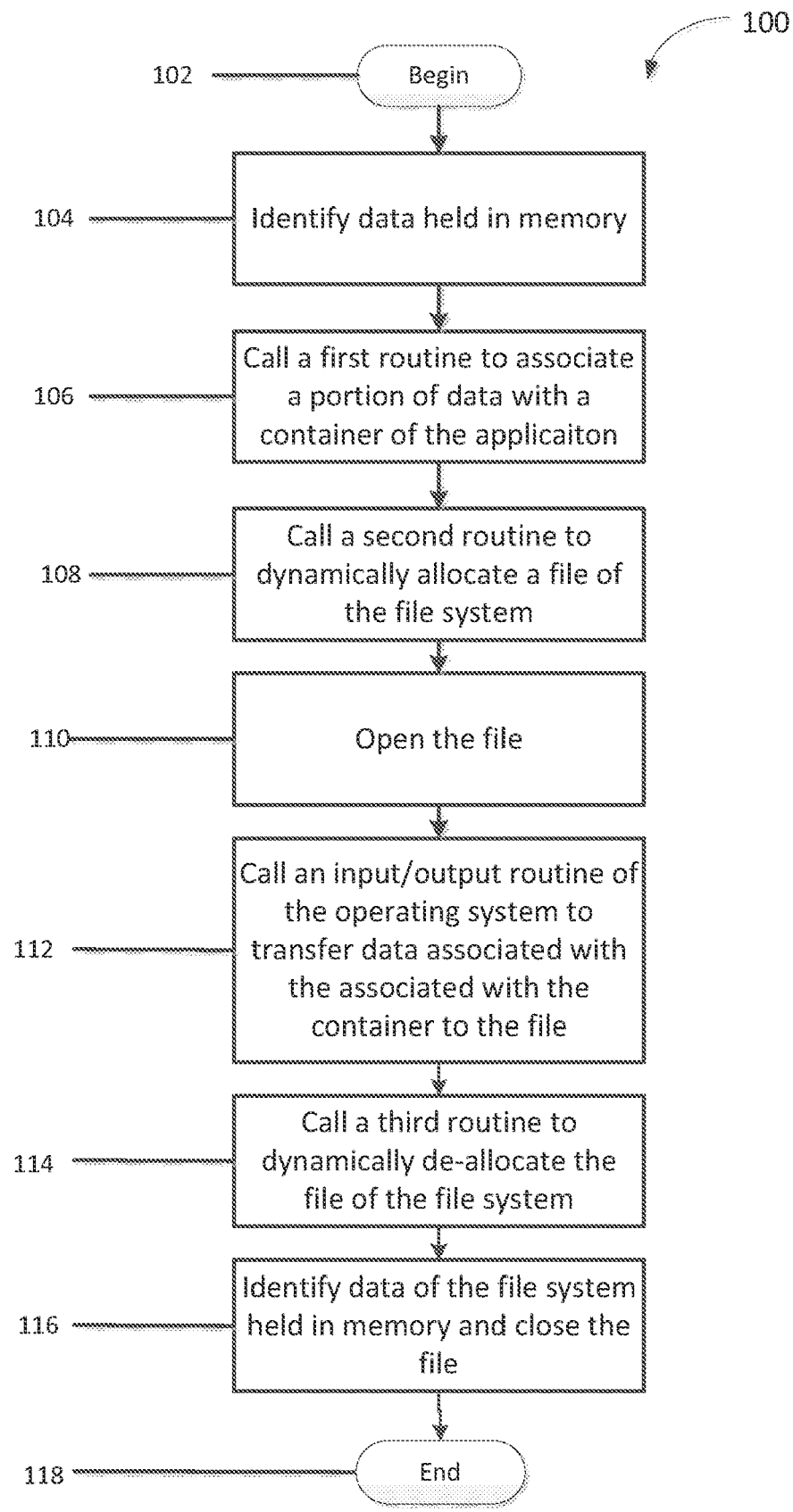
FIG. 1 is a flow diagram that illustrates an example embodiment as taught herein.

Embodiments taught herein, execute a computer implemented method for transferring digital information, for example, data between an application that processes a plurality of on-line transactions executed on a server and a file system of a server operating system. Embodiments taught herein relate to systems and methods for transferring digital information, for example, data between a Customer Information Control System (CICS) application and a UNIX environment. Other embodiments can include alternate operating systems, transaction processing systems and mainframe platforms. Some embodiments may include enabling a CICS to read or write files that are created directly in the CICS. Some embodiments disclosed herein can execute a transaction router customized code program preformed in a sequential process. Some embodiments taught herein can execute a virtual server mainframe.

Executable code of an on-line transaction application, in accordance with embodiments taught herein, identifies data held in memory under control of the on-line transaction application. Execution of the code identifies a file transfer request. File transfer requests can include conformance to the file transfer schema and contain root elements, as required by the on-line transaction application. Transfer definition rules can further include reference to source and destination data to facilitate the transfer of groups of files. The file transfer request can be user generated or systematically generated. File transfer requests can be generated in a sequential process, which can initiate or issue a series of program commands.

Execution of the executable code of an on-line transaction application calls a first routine to associate a portion of the data with a container of the application. The first routine can include the association of identification criteria with a block of data.

As used herein, containers and channels can be used to exchange large volumes of structured data between programs because they are not limited to a 32 KB restriction. A container can be a named or can include other identifiable criteria associated with a block of data with reference to a data storage area thereby enabling data transfer between programs. A container can be any size. A container is limited in size by the available storage. Data can be stored in any format as required or determined by the application. Any number of containers can be created within an application. Containers may further include a reference called a channel that can execute an application parameter held in the container. A channel can group several containers together into a single operational structure. Containers and channels are analogous to conventional programs to exchange data however the data structure employed can overcome data size restrictions. For example, containers and channels can be used to manage data transfer and data conversion between applications, and filter the required information to optimize memory management.

Execution of the executable code of the on-line transaction then calls a second routine to dynamically allocate a file of the file system of the server operating system. The second routine can, include executable code to create, delete, reference, access and manipulate a container. Execution of the executable code of the online transaction application opens the file of the file system of the server operating system and calls an input/output routine of the operating system to transfer the data associated with the container to the file of the file system. The executable code of the on-line transaction application enables multi-thread and/or multi-track data threads to be bi-directionally transferred between the mainframe application and the file system of the operating system. Multi-thread and/or multi-track data threads contain multiple sequences of programing instructions that can be managed independently by an operating system scheduler.

As taught herein, enablement of a computer implemented method for transferring digital information between an application that processes a plurality of on-line transactions executed on the server capable of bulk data processing and a file system of a server operating system allows users to improve data management and time management capabilities. Consolidating the transferring of digital information allows reduction in processing time. For example, conventional processing rates between an on-line transaction system and a file of an operating system are about 5 million records per hour. Some embodiments taught herein improve the transfer rates between an on-line transaction system and the same file of the operating system to processing rates of 500,000 records per second or 5 million records per 10 seconds. The methods, systems and non-transitory computer readable media as taught herein allows transfer of large volumes of records to support real time data transfer between an on-line transaction processing application and a file system. System requirements may include use of an assembler language, or configuring a server to receive serialized instructions or the ability to execute manually issued, systematically determined and/or automatically issued program commands.

FIG. 1 is a flow diagram, of an exemplary process for transferring digital information, for example data, between an application that processes on-line transactions executed one or more servers, and a file system of an operating system according to one embodiment. An application that processes on-line transactions can be a transaction management application such as, a CICS or a web services request received from multiple platforms. Process 100 may be implemented, for example, in a network environment 1110 and access multiple computers or servers. FIG. 1 is discussed in connection with FIG. 2, which illustrates a computing device, such as a server.

At step 102, the process may begin. At step 104, the execution of executable code by a processor 1002 identifies data held in memory 1006 under control of the application 1026. For example, the data may be a block of data held on a transaction server, for example, a server forming a CICS environment. At step 106, the execution of the executable code calls a first routine 1029 to associate a portion of the data with a container of the application. The container provides definition to otherwise undefined files. Containers can allow on-line transactions to be associated and linked together.

At step 108, execution of executable code 1002 calls a second routine 1031 to dynamically allocate a file of the file system of the operating system. For example, dynamically allocating may include enabling the file to batch process a plurality of data or altering the messaging and queuing method of the data. The dynamic allocation instructions may be in the form of an altered commercially available macro, or a customized application specific macro. Dynamic allocation of the files can enable files to be readable and/or writeable in a CICS environment or the like.

At step 110, execution of the executable code of the on-line transaction application opens the file 1019 of the file system 1017 of the operating system. At step 112, the execution of the executable code of the on-line transaction application calls an input/output routine of the operating system to transfer the data associated with the container to the file of the file system of the operating system. For example, transferring the data associated with the container may include generating a directory or index of file identifiers. Payloads containing file identification information may enable multi-threaded processes to generate and transfer large data payloads. The data payloads may consist of a consolidated or a compressed data form. The payload may be comprised of names, file source information, file reference information, or other file specific information that may facilitate improved data management.

At step 114, Execution of the executable code of the on-line transaction application calls a third routine 1033 to dynamically de-allocate the file of the file system of the operating system. For example, dynamic de-allocation may include, instructing the file to provide the data, or disabling a parameter. Alternately, dynamic de-allocation may include initiation of an alternate parameter or functionality. At step 116, the data of the file system held in memory is identified, and the file is closed. The process ends at step 118.

Figure 2:
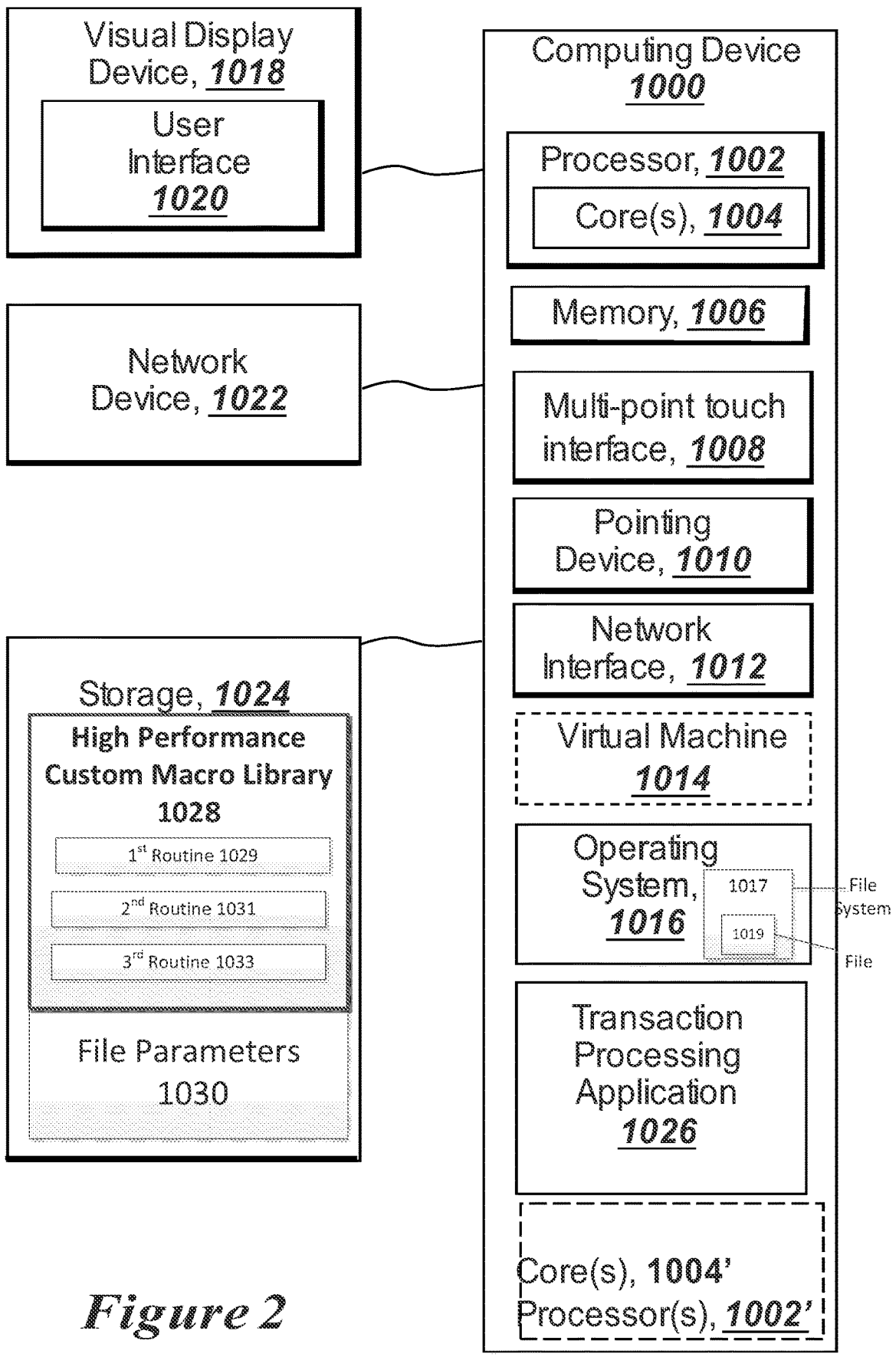
FIG. 2 is a block diagram of an exemplary computing device that can perform any of the methods provided by exemplary embodiments.

FIG. 2 is a block diagram, of an exemplary computing device 1000 that may be used to perform any of the methods provided by exemplary embodiments. The computing device 1000 may be any suitable computing or communication device or system such as a workstation, desktop computer, server, laptop, handheld computer, tablet computer (e.g., the iPad™ tablet computer), mobile computing or communication device (e.g., the iPhone™ communication device) or other form of computing or telecommunications device that is capable of communication and that has sufficient processor power and memory capacity to perform the operations described herein.

The computing device 1000 includes one or more non-transitory computer-readable media for storing one or more computer-executable instructions, programs or software for implementing exemplary embodiments. The non-transitory computer-readable media may include, but are not limited to, one or more types of hardware memory, non-transitory tangible media (for example, one or more magnetic storage disks, one or more optical disks, one or more USB flash-drives), and the like. For example, memory 1006 included in the computing device 1000 may store computer-readable and computer-executable instructions, programs or software for implementing exemplary embodiments. Memory 1006 may include a computer system memory or random access memory, such as DRAM, SRAM, EDO RAM, and the like. Memory 1006 may include other types of memory as well, or combinations thereof.

The computing device 1000 also includes processor 1002 and associated central processing unit core 1004, and optionally, one or more additional processor(s) 1002' and associated core(s) 1004' (for example, in the case of computer systems having multiple processors/cores), for executing computer-readable and computer-executable instructions or software stored in the memory 1006 and other programs for controlling system hardware. Processor 1002 and processor(s) 1002' may each be a single core processor or multiple core (1004 and 1004') processor.

Virtualization may be employed in the computing device 1000 so that infrastructure and resources in the computing device may be shared dynamically. A virtual machine 1014 may be provided to handle a process running on multiple processors so that the process appears to be using one computing resource rather than multiple computing resources. Multiple virtual machines may also be used with one processor.

A user may interact with the computing device 1000 through a visual display device 1018, such as a computer monitor, which may display one or more user interfaces 1020 that may be provided in accordance with exemplary embodiments, for example, the exemplary interfaces illustrated in FIG. 2. The visual display device 1018 may also display other aspects, elements and/or information or data associated with exemplary embodiments, for example, views of databases, UNIX systems services files, and Customer Information Control Systems Macros, and the like. The computing device 1000 may include other input/output (I/O) devices for receiving input from a user, for example, a keyboard or any suitable multi-point touch interface 1008, a pointing device 1010 (e.g., a mouse). The keyboard 1008 and the pointing device 1010 may be coupled to the visual display device 1018. The computing device 1000 may include other suitable conventional I/O peripherals.

The computing device 1000 may include one or more storage devices 1024, such as a hard-drive, CD-ROM, or other computer readable media, for storing data and computer-readable instructions and/or software that implement exemplary embodiments of an application for processing a plurality of on-line transactions executing on the server and the file system of an operating system 1030 as taught herein. The file system is used to determine how data is stored and received. The file system provides structure to the data to make the data readily identifiable.

Exemplary storage device 1024 may also store one or more databases for storing any suitable information required to implement exemplary embodiments. The databases may be updated by a user or automatically at any suitable time to add, delete or update one or more items in the databases.

Exemplary storage device 1024 may store one or more high performance custom macro library 1028 for storing information related to managing storage and re-entrance for a container of the application, and the like. High performance custom macro library 1028 may also include information on the management of a storage area, including routines 1029 supporting dynamic allocation to support open pass back and forth, allowing on-line transactions to be tied together, and the like.

Exemplary storage device 1024 may store one or more file parameters 1030 for storing information files. The file parameters 1030 may also include multi-thread and multi-track data information, transaction information including, but not limited to, data payload information, batch job on-line transactions, storage commands, commercial and customized macros, file definitions such as parameters or metadata defining the file or data associated with the file, server instructions, and the like.

The computing device 1000 may include a network interface 1012 configured to interface via one or more network devices 1022 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 1012 may include a built-in network adapter, network interface card, PCMCIA network card, card bus network adapter, wireless network adapter, USB network adapter, modem or any other device suitable for interfacing the computing device 1000 to any type of network capable of communication and performing the operations described herein.

The computing device 1000 may run any operating system 1016, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. In an exemplary embodiment, the operating system 1016 may include a file system 1017 and a file 1019. In exemplary embodiments, the operating system 1016 may be run in native mode or emulated mode. In an exemplary embodiment, the operating system 1016 may be run on one or more cloud machine instances.

The computing device 1000 may run any on-line transaction processing application 1026, such as any version of the IBM Customer Information Control Systems suite of applications, or any other on-line transaction processing application capable of running on the computing device and preforming the operations described herein. In exemplary embodiments, the on-line transaction processing application 1026 may be run on one or more cloud machine instances.

Figure 3:
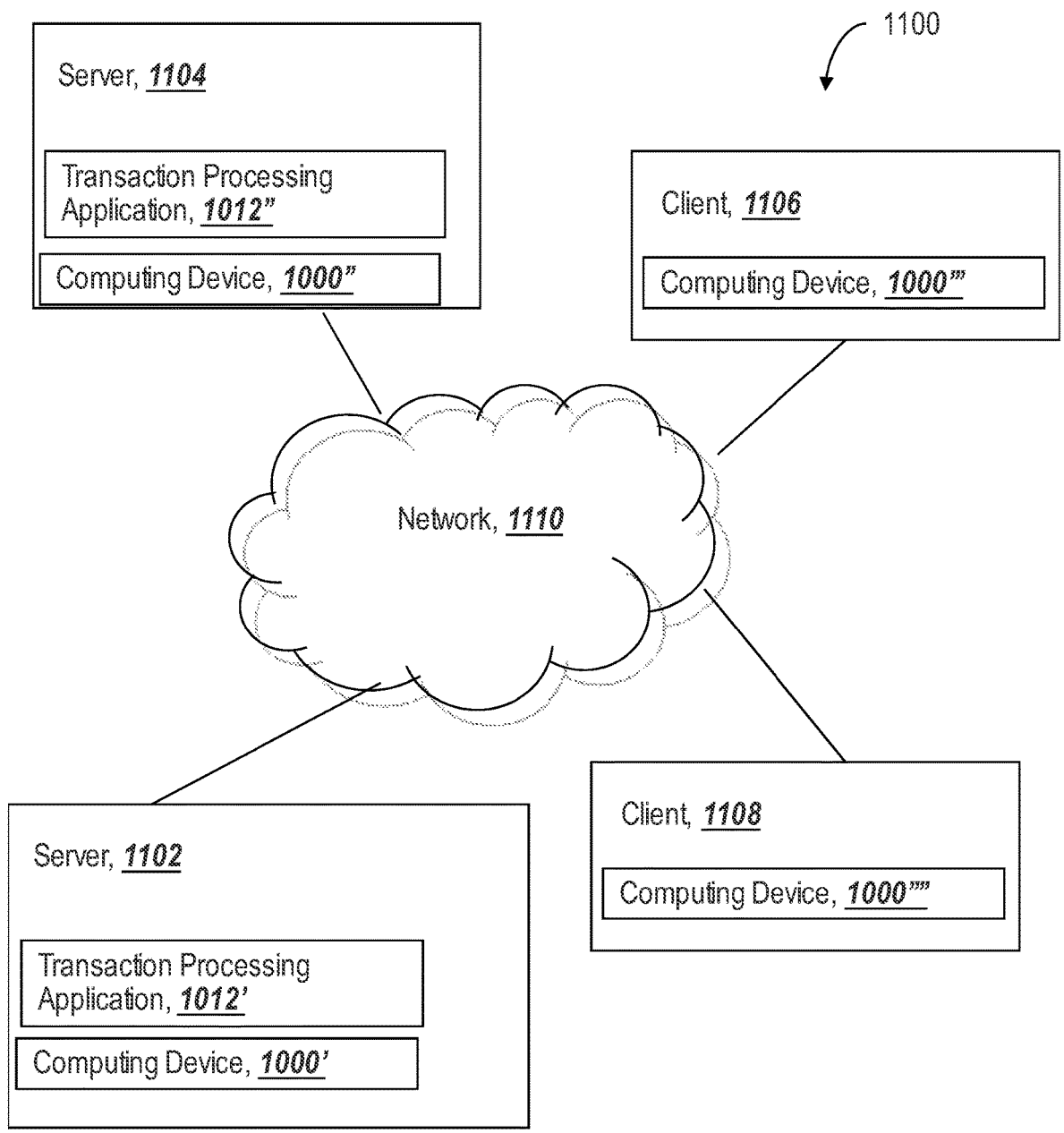
FIG. 3 is a block diagram of an exemplary network environment suitable for a distributed implementation of exemplary embodiments.

FIG. 3 is a block diagram of an exemplary network environment 1100 suitable for a distributed implementation of exemplary embodiments. The network environment 1100 may include one or more servers 1102 and 1104 coupled to one or more clients 1106 and 1108 via a communication network 1110. The servers 1102 and 1104 may take the form of computing device 1000 or include one or more on-line transaction processing applications 1012' and 1012". The client's 1106 and 1108 may take the form of 1000''' and 1000''''.

The network interface 1012 and the network device 1022 of the computing device 1000 enable the servers 1102 and 1104 to communicate with the client's 1106 and 1108 via the communication network 1110. The communication network 1110 may include, but is not limited to, the Internet, an intranet, a LAN (Local Area Network), a WAN (Wide Area Network), a MAN (Metropolitan Area Network), a wireless network, an optical network, and the like. The communication facilities provided by the communication network 1110 are capable of supporting distributed implementations of exemplary embodiments.

In an exemplary embodiment, the servers 1102 and 1104 may provide the client's 1106 and 1108 with non-transitory computer-readable and/or computer-executable components or products under a particular condition, such as a license agreement. The non-transitory computer-readable and/or computer-executable components or products may include those for providing and rendering an exemplary transaction router customized code user interface. A transaction router customized code may be a unit of processing of source level code supplied in an assembler language. A transaction router includes the execution of recoverable unit of work. The client's 1106 and 1108 may provide and render an exemplary graphical user interface using the computer-readable and/or computer-executable components and products provided by the servers 1102 and 1104. In an exemplary embodiment, the client's 1106 and 1108 may transmit information on a transaction router customized code operation defined by the user using the user interface to the servers 1102 and 1104 that may, in turn, automatically execute the transaction router customized code operation.

In another exemplary embodiment, the client's 1106 and 1108 may provide the servers 1102 and 1104 with non-transitory computer-readable and computer-executable components or products under a particular condition, such as a license agreement. The computer-readable and computer-executable components or products may include those for providing and rendering an exemplary integrated transaction router customized code user interface. For example, in an exemplary embodiment, the servers 1102 and 1104 may provide and render an exemplary graphical user interface using the computer-readable and/or computer-executable components and products provided by the client's 1106 and 1108. In an exemplary embodiment, the servers 1102 and 1104 may transmit information on a transaction router customized code operation defined by the user using the user interface to the client's 1106 and 1108 that may, in turn, automatically execute the transaction router customized code operation.

Figure 4:
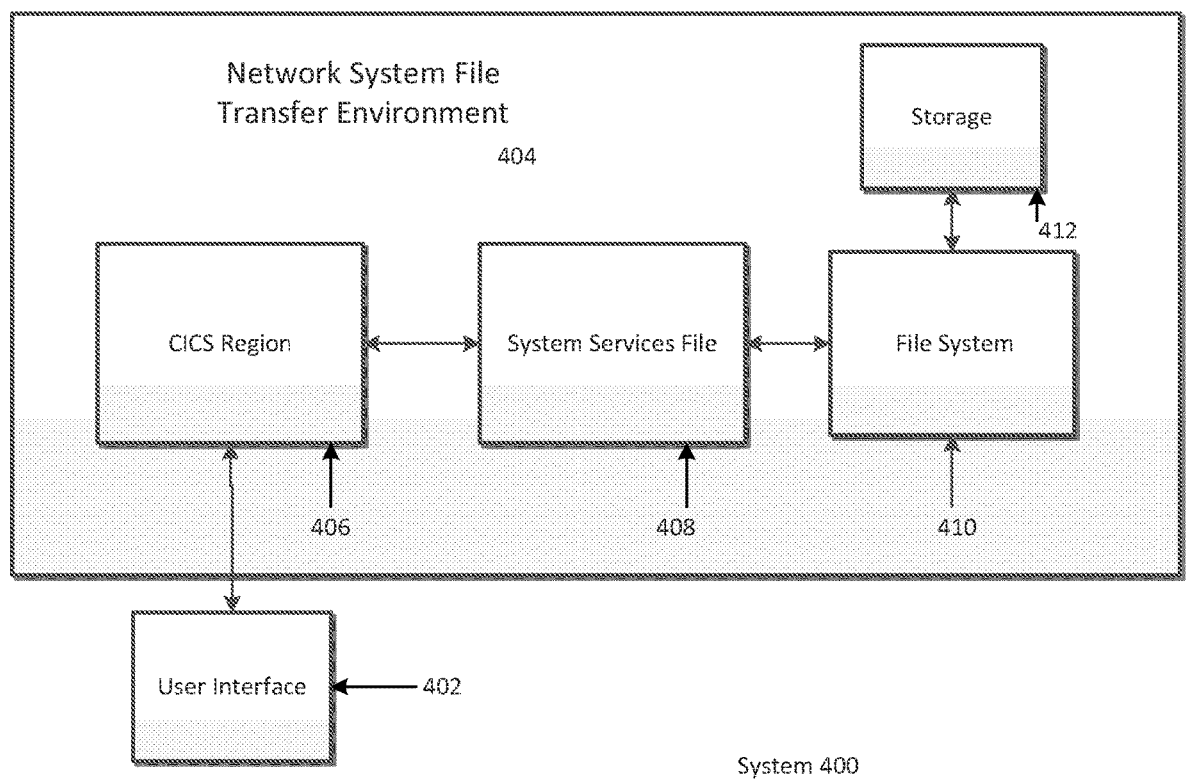
FIG. 4 is a block diagram of an exemplary network system architecture that illustrates an exemplary embodiment.

FIG. 4 is a block diagram of the network system architecture for transferring digital information between, an application that processes a plurality of on-line transactions executed on one or more servers, and a file system of the server operating system according to one embodiment. Network System architecture 400 may be implemented, for example, in the network environment 1110 and access multiple computers or servers. The network system architecture 400 may include one or more user interfaces coupled to the network system file transfer environment 404. In some embodiments the user interface 402, may include a personal computer, a mobile computing device or a series of networked devices capable of interfacing with the Network System File Transfer Environment 404.

The user interface 402 may be coupled to the Customer Information Control Systems (CICS) region 406. A CICS region is a named instance of a CICS transaction server that runs in its own independent address space. A CICS region can be started and stopped independently of other CICS regions regardless of whether the other CICS regions are located on the same transaction server. The CICS region may be used to monitor access and provide information related to the server to support rapid high volume on-line transaction processing.

The CICS region 406 is further coupled to a System Services File 408. The System Services File 408 may be configured to allow sequential or batch processing of CICS requests. The System Services Files 408 may be configured to execute software to sequentially process and transfer large data payload in real run/response time. The System Services File 408, are coupled to the File System 410. In some embodiments the System Services File 408, may enable sequential or batch on-line transactions and issue a batch or sequential command to the File System 410. The File System 410 may be coupled to the Storage Environment 412. The File System 410 may utilize the executable code commands issued from the System Services Files 408, to identify data stored in the Storage Environment 412.

Figure 5:
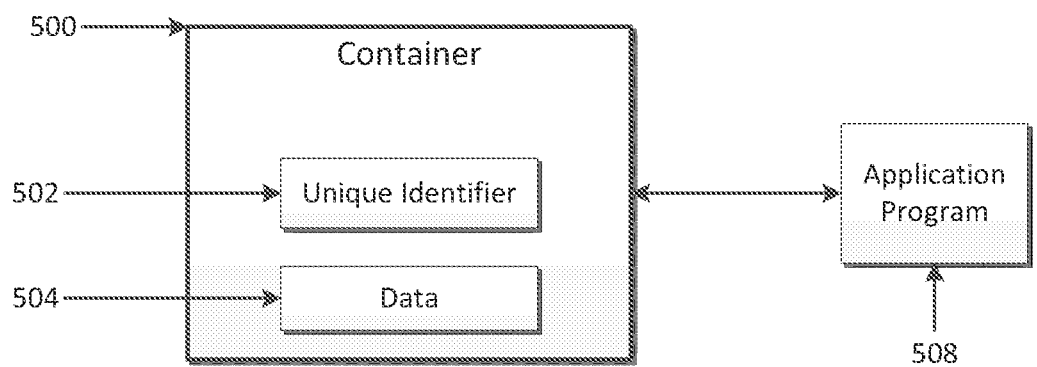
FIG. 5 is a block diagram of an exemplary container that illustrates an exemplary embodiment.

FIG. 5 is a block diagram of an example container for transferring digital information to, an application according to one embodiment. The container 500 may be implemented, for example, in the network environment 1110 and access multiple computers or servers. The container 500, includes unique identifier 502, for example, an unique address or unique data information 504. The container 500 can be passed to an application 508.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

I claim:

1. A computer implemented method for transferring digital information between an application executing on the computer and a file system of an operating system comprising:
    identifying data held in memory under control of a plurality of instances of Consumer Information Control System (CICS) that execute in independent address spaces and process a plurality of online transactions;
    calling a first routine to associate a portion of the data with a container of a first instance of the plurality of instances wherein the container is limited in size by available storage and comprises a unique identifier, a channel that executes an application parameter, and associations of the plurality of online transactions;
    calling a second routine to dynamically allocate a file of the file system, wherein dynamically allocating further comprises batch processing a plurality of data associated with the container, and wherein the second routine comprises a macro function to batch process the plurality of data associated with the container within the first instance of the plurality of instances;
    opening the file of the file system;
    calling an input/output routine of the operating system to transfer the data associated with the container, the unique identifier, the channel, and the associations to the file of the file system,
    wherein transferring the data associated with the container includes generating an index of file identifiers, and transferring payloads containing the file identifiers to the file system to enable multi-threaded processes, wherein one of the payloads includes at least one of names, file source information, file reference information, or other file specific information that may facilitate improved data management; and calling a third routine to dynamically de-allocate the file of the file system, wherein dynamically de-allocating further comprises identifying the data of the file system held in memory and closing the file.

2. The method of claim 1, further comprising: receiving a transfer request from the application that processes the plurality of on-line transactions for the file.

3. The method of claim 1, further comprising: configuring the file for a bi-directional transfer between the application that processes the plurality of on-line transactions and the file system.

4. The method of claim 1 wherein, a second instance of the plurality of instances in an independent address space, processes the data associated with the container, the unique identifier, the channel, and the associations to the file of the file system.

5. A system for transferring digital information between an application on the computer and a file system of an operating system, the system comprising:
- a memory under control of the application to store data;
- at least one processor operatively coupled to the memory to identify the data, wherein a plurality of instances of Consumer Information Control System (CICS) that execute in independent address spaces of the memory and process a plurality of online transactions to:
  - call a first routine to associate a portion of the data with the container of a first instance of the plurality of instances wherein the container is limited in size by available storage and comprises a unique identifier, a channel that can execute an application parameter, and associations of the plurality of online transactions;
  - call a second routine to dynamically allocate a file of the file system, wherein dynamically allocating further comprises batch processing a plurality of data associated with the container, and wherein the second routine comprises a macro function to batch process the plurality of data associated with the container within the first instance of the plurality of instances; to open the file of the file system;
  - call an input/output routine of the operating system to transfer the data associated with the container, the unique identifier, the channel, and the associations to the file of the file system, wherein transferring the data associated with the container includes generating an index of file identifiers, and transferring payloads containing the file identifiers to the file system to enable multi-threaded processes, wherein one of the payloads includes at least one of names, file source information, file reference information, or other file specific information that may facilitate improved data management; and
  - call a third routine to dynamically de-allocate the file of the file system, wherein dynamically de-allocating further comprises identifying the data of the file system held in memory and closing the file.

6. The system of claim 5, wherein the processor is further configured to receive, a transfer request from the application that processes the plurality of on-line transactions for the file.

7. The system of claim 5, wherein the processor is further configured to configure, the file for a bi-directional transfer between the application that processes the plurality of on-line transactions and the file system.

8. The system of claim 5, wherein the processor is further configured to enable, the file to batch process the plurality of data associated with the container.

9. A non-transitory computer readable medium comprising instructions configured to cause a computer processor to execute a method transferring digital information between an application executing on the computer and a file system of an operating system comprising:
- identifying data held in memory under control of a plurality of instances of a Consumer Information Control System (CICS) that execute in independent address spaces and process a plurality of online transactions;
- calling a first routine to associate a portion of the data with a container of a first instance of the plurality of instances wherein the container is limited in size by available storage and comprises a unique identifier, a channel that can execute an application parameter, and associations of the plurality of online transactions;
- calling a second routine to dynamically allocate a file of the file system, wherein dynamically allocating further comprises batch processing a plurality of data associated with the container, and wherein the second routine comprises a macro function to batch process the plurality of data associated with the container within the first instance of the plurality of instances;
- opening the file of the file system;
- calling an input/output routine of the operating system to transfer the data associated with the container, the unique identifier, the channel, and the associations to the file of the file system,
- wherein transferring the data associated with the container includes generating an index of file identifiers, and transferring payloads containing the file identifiers to the file system to enable multi-threaded processes, wherein one of the payloads includes at least one of names, file source information, file reference information, or other file specific information that may facilitate improved data management; and
- calling a third routine to dynamically de-allocate the file of the file system, wherein dynamically de-allocating further comprises identifying the data of the file system held in memory and closing the file.

10. The non-transitory computer readable medium of claim 9, further comprising receiving a transfer request from the application that processes the plurality of on-line transactions for the file.

11. The non-transitory computer readable medium of claim 9, further comprising configuring the file for a bi-directional transfer between the application that processes the plurality of on-line transactions and the file system.

12. The non-transitory computer readable medium of claim 9, further comprising enabling the file to batch process the plurality of data associated with the container.

13. The non-transitory computer readable medium of claim 9, wherein a second instance of the plurality of instances in an independent address space, processes the data associated with the container, the unique identifier, the channel, and the associations to the file of the file system.

* * * * *